United States Patent [19]

Irie et al.

[11] 4,158,860
[45] Jun. 19, 1979

[54] METHOD FOR DRIVING AN X-Y MATRIX TYPE LIQUID CRYSTAL DISPLAY PANEL

[75] Inventors: Hiroyuki Irie, Osaka; Susumu Ide, Katano; Tamotsu Matsuo, Osaka, all of Japan

[73] Assignee: Matsushita Electric Industrial Co., Ltd., Osaka, Japan

[21] Appl. No.: 832,480

[22] Filed: Sep. 12, 1977

[30] Foreign Application Priority Data

Sep. 20, 1976 [JP] Japan ................... 51-113456

[51] Int. Cl.$^2$ .......................... H04N 5/66; G02F 1/28
[52] U.S. Cl. ........................ 358/230; 358/236; 350/333
[58] Field of Search ............... 358/230, 236, 241, 240; 350/331, 332, 333

[56] References Cited

U.S. PATENT DOCUMENTS 3,575,492  4/1971  Nester et al. .................. 350/333
3,575,493  4/1971  Heilmeier ..................... 350/332

OTHER PUBLICATIONS

*Liquid Crystal Matrix Displays,* Lechner et al., Proceedings of the I.E.E.E., vol. 59, No. 11, Nov. 1971.

*Primary Examiner*—Robert L. Richardson
*Attorney, Agent, or Firm*—Stevens, Davis, Miller & Mosher

[57] ABSTRACT

The present invention relates to a driving method for displaying television signals on an X-Y matrix type liquid crystal display panel having both switching elements and memory elements for respective picture elements which utilizes the phenomenon that high frequencies reduce the erasing time of the liquid crystals. According to the present invention, when a panel is driven by means of a line at a time process, each horizontal scanning period is divided into two periods, a video signal period and a erasing signal period, thereby to provide a composite signal having a video signal portion and an erasing signal portion so that a first pulse corresponding to the video signal period writes the video signal on that panel and a plurality of second pulses corresponding to the erasing signal period applies the erasing signal to the panel for erasing.

6 Claims, 9 Drawing Figures

METHOD FOR DRIVING AN X-Y MATRIX TYPE LIQUID CRYSTAL DISPLAY PANEL

FIELD OF THE INVENTION

The present invention relates to a driving method for displaying television signals on an X-Y matrix type liquid crystal display panel having both switching elements and memory elements for respective picture elements.

DESCRIPTION OF THE PRIOR ART

Figure 1:
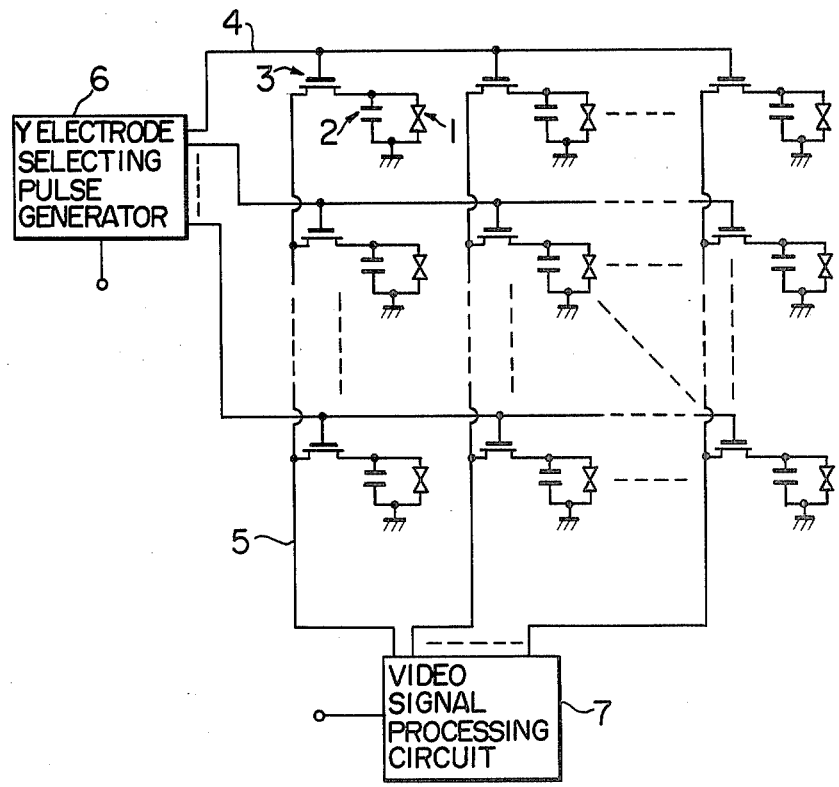
FIG. 1 shows a circuit diagram of a conventional X-Y matrix type panel.

Heretofore, in order to display television signals on a liquid crystal panel, an X-Y matrix type apparatus having switching elements for respective picture elements has been proposed. FIG. 1 shows a circuit diagram of such an X-Y matrix type panel. In FIG. 1, numeral 1 is a liquid crystal, numeral 2 is a memory capacitor, numeral 3 is a switching element formed of a MOS transistor; these three elements constitute one picture element. Numerals 4 and 5 correspond to a Y electrode and an X electrode of an X-Y matrix type panel, respectively. Numeral 6 is a Y electrode selecting pulse generator, and numeral 7 is a video signal processing circuit. The provision of the switching element 3 and the memory capacitor 2 in each picture element is necessitated by the fact that, in view of the reaction rate of the liquid crystal, a memory circuit for one field period or one frame period of television signals must be provided for each picture element.

Next, the conventional process in which a liquid crystal panel with its respective picture elements provided with circuits is applied with television signals will be described with reference to FIG. 1. The panel is driven, in view of the switching speed of the MOS transistor provided in each picture element, by means of the line of a time process which is commonly used for driving an EL panel and a gas discharge panel. Thus, the Y electrodes are successively selected every horizontal scanning period and all the MOS transistors 3 along one Y electrode (4 in FIG. 1) are simultaneously turned on. On the other hand, video signals are applied to the video signal processing circuit 7 to be converted to parallel signals, which are then supplied simultaneously every horizontal scanning period to respective X electrodes. The video signal processing circuit 7 consists of a sampling-holding circuit and more particularly includes a sampling pulse generator for forming sampling pulses synchronized with the horizontal synchronizing signals, a capacitor memory circuit, an amplifier or the like.

Figure 2:
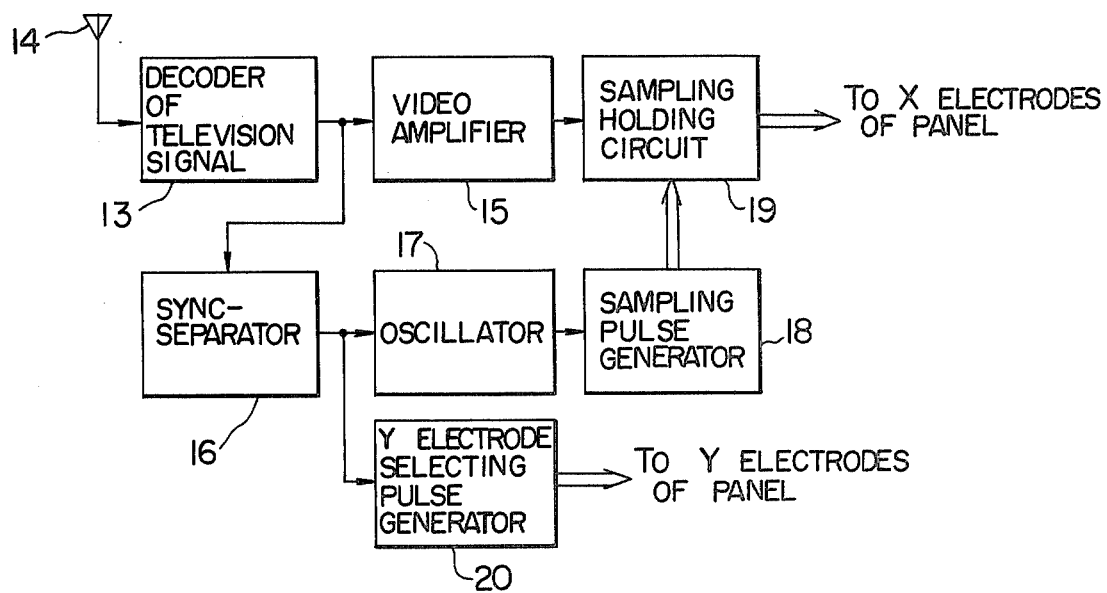
FIG. 2 shows a block diagram of a conventional panel driving circuit.
Figure 3:
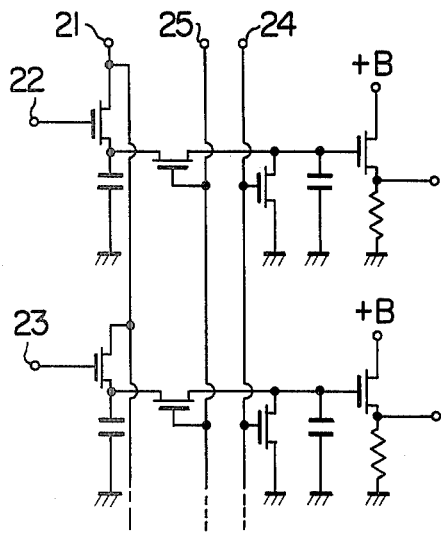
FIG. 3 shows a detailed view of the substantial portion of FIG. 2.
Figure 4:
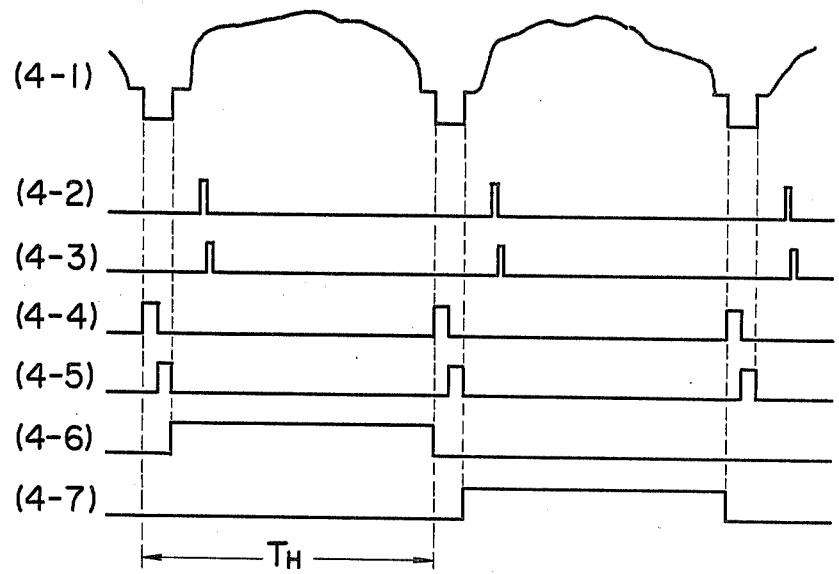
FIG. 4 shows waveforms for illustrating the operation of FIG. 2.

FIG. 2 shows a block diagram illustrating the operation of the panel shown in FIG. 1, FIG. 3 shows a detailed view of the substantial portion of FIG. 2, and FIG. 4 shows time charts in the operation shown in FIG. 2. In FIG. 2, numeral 13 is a decoder of television signals received by an antenna 14 and includes a tuner, a VIF and a detector. Numeral 15 is a video amplifier, numeral 16 is a sync-separator, numeral 17 is an oscillator synchronized with the horizontal synchronizing signal, numeral 18 is a sampling pulse generator, numeral 19 is a sampling-holding circuit, and numeral 20 is a Y electrode selecting pulse generator. FIG. 3 is a capacitor memory circuit as an embodiment of the sampling-holding circuit 19 in FIG. 2. As described above, this circuit serves to convert the video signals as series signals to parallel signals. The pulse width of sampling is determined by the number of the picture elements in the horizontal direction and, as soon as a Y electrode is selected, all the X electrodes are supplied with signals, that is, each of the corresponding liquid crystals in the panel is applied with the signal. In FIG. 4, numeral 4-1 is an output signal of the video amplifier 15 in FIG. 2, which is to be applied to a terminal 21 in FIG. 3. Symbol $T_H$ means the duration of one horizontal scanning period. Numerals 4-2 and 4-3 show sampling pulses which are applied to terminals 22 and 23 in FIG. 3, respectively. Numeral 4-4 shows discharge pulses which are applied to a terminal 24 in FIG. 3 and numeral 4-5 shows transfer pulses which are applied to a terminal 25 in FIG. 3. Both the discharge pulses 4-4 and the transfer pulses 4-5 are generated within a horizontal fly-back period and the latter is generated after the former has been generated. Numerals 4-6 and 4-7 show Y electrode selecting pulses as output signals of the Y electrode selecting pulse generating circuit 20. In operation, within one horizontal scanning period, the video signal is successively sampled by the sampling pulses so as to be stored in the first stage capacitors. Next, after the second stage capacitors have been discharged by the discharge pulse to be cleared, the signals stored in the first stage capacitors are transferred simultaneously by the transfer pulse to the second stage capacitors and further the transferred signals are applied through the switching elements at all the X electrodes. When the circuit as described above is used, it can be made possible to write and display a television signal on the panel. Now, the reaction rate of the liquid crystal will be considered. Since each of the picture elements is provided with the switching element and the memory element, the duration of one frame period in television signals, that is, 1/30 second (about 33 msec) in the case of the standard television signal can be utilized as writing and erasing time. On the other hand, usual liquid crystal materials have a rising time and an erasing time of about several tens and several hundreds msec., respectively, and therefore, a liquid crystal having a high reaction rate, in particular a short erasing time, must be selected for displaying television signals thereon. Thus, when a liquid crystal having a low reaction rate is used, the quality of the picture is deteriorated in that, for example, rapidly changing scenes and neutral tints cannot be well displayed.

SUMMARY OF THE INVENTION

A primary object of the present invention is to provide a driving method for displaying television signals by utilizing the known phenomenon that the application of high frequencies (of more than several hundreds Hz) to liquid crystals reduces their erasing times.

A secondary object of the present invention is to provide a driving method capable of displaying all the effective scanning lines of television signals.

The present invention proposes a driving method for displaying television signals in which the known phenomenon that the application of high frequencies (of more than several hundreds Hz) reduces the erasing times is utilized for driving liquid crystals; and thus, according to the present invention, when an X-Y matrix type liquid crystal panel having switching elements for respective picture elements is driven by means of the line at a time process, each horizontal scanning period is divided into substantially two equal periods which are used as the writing time and the erasing time.

Generally in liquid crystals, the rising time is shorter than the erasing time and can be made still shorter in proportion to the square of the applied voltage, for example, shorter than the one field period (1/60 sec. or 16.6 msec). On the other hand, it is known that the application of frequencies more than the critical frequency over which the liquid crystal does not respond makes the erasing time shorter, and this is particularly remarkable in dynamic scattering mode (DSM) liquid crystals. Thus, according to the present invention, there is provided a driving method for a liquid crystal panel which can display television signals by effectively utilizing the above-mentioned decrease in erasing time.

DESCRIPTION OF THE PREFERRED EMBODIMENTS

Figure 5:
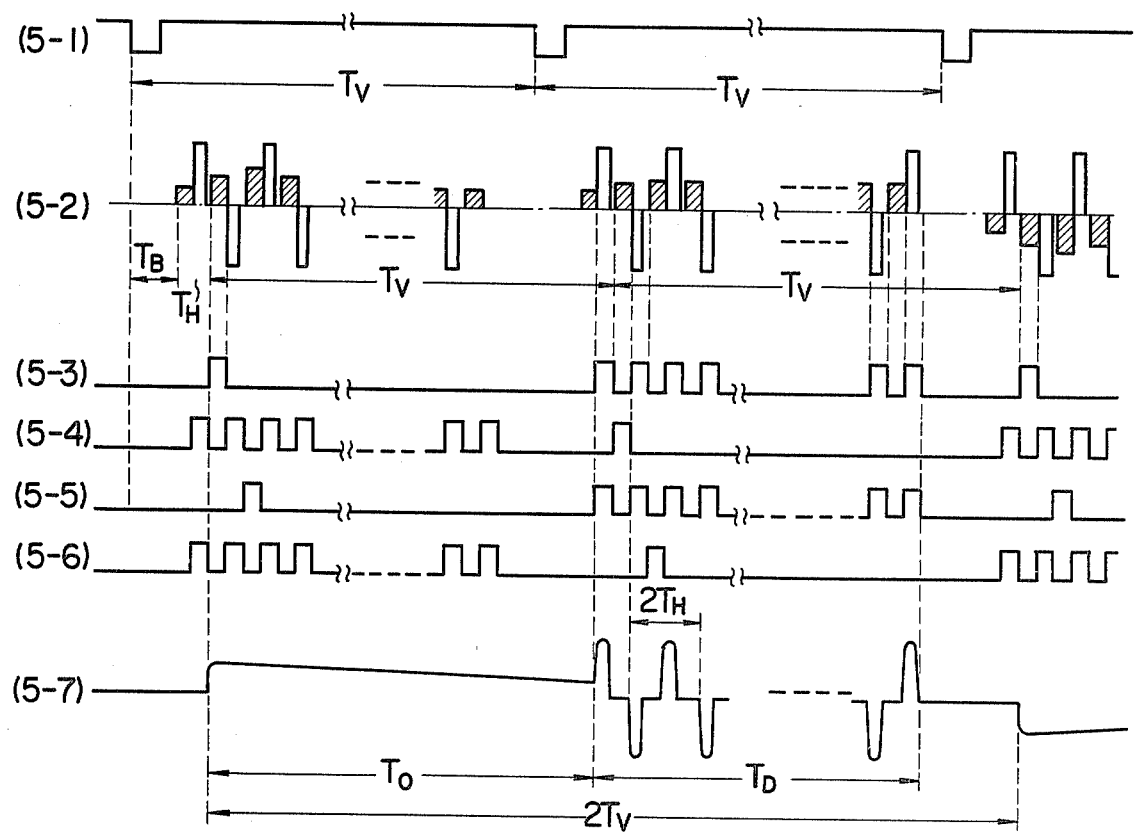
FIG. 5 shows waveforms for illustrating the present invention.

In the following, one embodiment of the present invention will be described with reference to the drawings. The scanning of the panel is performed by means of the line at a time process in which one horizontal scanning period is divided into two periods, the writing time and the erasing time, and scanning is successively repeated such that a picture element written in the first field is erased in the next field. The panel used in this embodiment is that shown in FIG. 1 as a conventional example, which includes a liquid crystal and has a group of electrodes arranged in an X-Y matrix. FIG. 5 shows time charts according to this invention. In FIG. 5, numeral 5-1 shows a vertical synchronizing signal, where $T_V$ means one field period. Numeral 5-2 shows an X electrode driving signal which is applied to the i-th electrode $X_i$ of the X electrode group (FIG. 1, 5). The X electrode driving signal 5-2 comprises a video signal component which is shown as shaded regions and is to be sampled and held and an erasing signal component which is shown as unshaded pulse-like regions, where, $T_B$ means the vertical fly-back period, and $T_H$ means one horizontal scanning period. Numeral 5-3 shows a signal which is applied to the j-th electrode $Y_j$ of the Y electrode group (FIG. 1, 4). The signal 5-3 is a Y electrode driving signal which includes, for example, one writing pulse corresponding to the video signal component in the case of odd number field and a plurality of pulses corresponding to the erasing signal component in the case of even number field. Numeral 5-4 shows a signal which is applied to the $Y_{j+1}$ electrode. When the signal 5-3 is defined as described above, the signal 5-4 is a driving signal which includes a plurality of pulses in the case of odd number field and one pulse in the case of even number field. Numerals 5—5 and 5-6 show signals which are applied to the electrodes $Y_{j+2}$ and $Y_{j+3}$, respectively. The signal 5—5 includes one pulse and a plurality of pulses just like the signal 5-3 except that the one pulse in the signal 5—5 is delayed by one horizontal scanning period to the one pulse in the signal 5-3 applied in the case of odd number field, while the signal 5-6 includes one pulse and a plurality of pulses just like the signal 5-4 except that the one pulse in the signal 5-6 is delayed by one horizontal scanning period to the one pulse in the signal 5-4 applied in the case of even number field. These X and Y electrode driving signals are established in consideration of interlaced scanning. Numeral 5-7 shows the voltage waveform between both the electrodes of the memory capacitor in the picture element corresponding to the crossing point of the $X_i$ and $Y_j$ electrodes, where $T_o$ and $T_D$ means the time interval during which the video signal and the erasing signal are applied to the liquid crystal, respectively. $T_o$ and $T_D$ are required only to satisfy the relation $T_o + T_D \leq 2T_V$. As is evident from these time charts, the X electrode driving signal includes within its one horizontal scanning period the video signal component resulting from converting series video signals to parallel signals and the erasing signal component. Thus, for example, it is possible to shorten the erasing time by applying a writing pulse corresponding to the video signal component to one Y electrode in the case of an odd number field and applying successive pulses corresponding to the erasing signal component in the case of an even number field. In particular, in one embodiment of the present invention, the frequency of the erasing signal which is applied to the liquid crystal is 15.75/2 KHz and thus it becomes possible to apply an AC signal of about 8 KHz. In order to perform such driving, it is sufficient only to change the sampling-hold circuit 19 and the Y electrode selecting pulse generator 20 in the conventional example shown in FIG. 2, while the signal which is to be applied to the X electrodes can be provided by adding an erasing signal when the video signals are converted into parallel signals and the signal which is to be applied to the Y electrodes can be provided by alternately applying the writing pulse and the erasing pulse substantially every field.

Figure 6:
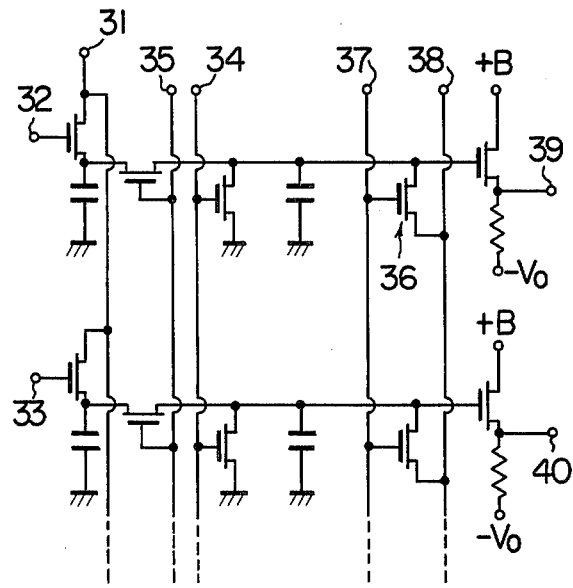
FIG. 6 shows an embodiment of a circuit for forming a signal which is to be applied to an X electrode according to the present invention.
Figure 7:
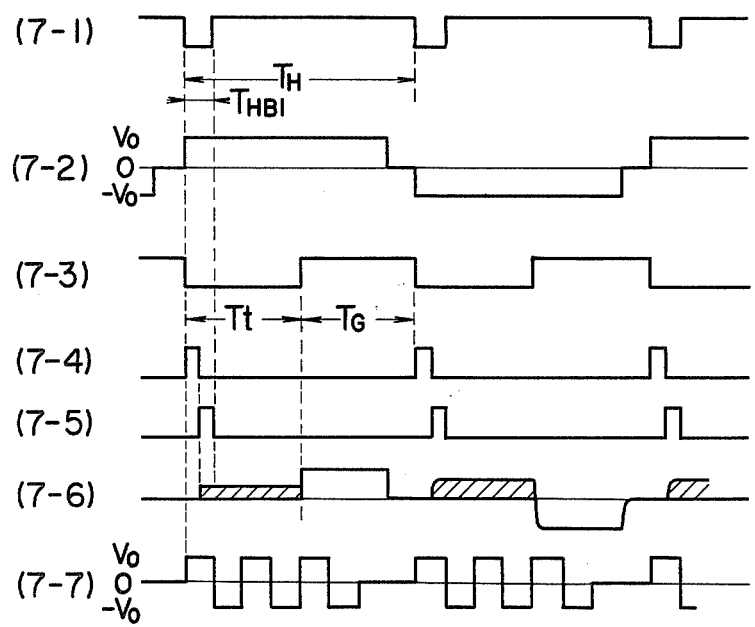
FIG. 7 shows waveforms illustrating the operation of FIG. 6.

FIG. 6 and FIG. 7 show an example of the sampling-holding circuit and its operation waveforms. In FIG. 6, terminals 31, 32, 33, 34 and 35 correspond also with respect to operation to the terminals 21, 22, 23, 24 and 25 shown in FIG. 3. Numeral 36 is a MOS transistor for adding the erasing pulse signal, numerals 37 and 38 are terminals for adding the gate pulse and the erasing signal, respectively. Numerals 39 and 40 are output signal terminals connected with the X electrodes of the panel, respectively. In FIG. 7, numeral 7-1 shows a horizontal synchronizing signal, where $T_H$ means one horizontal scanning period. Numeral 7-2 shows a waveform which is obtained as a result of frequency-dividing by ½ and is applied to the terminal 38. Numeral 7-3 shows a waveform which is obtained when a monostable multivibrator (not shown) is operated with the horizontal synchronizing signal taken as a standard, and is applied to the electrode 37, where, $T_t$ means the time constant, and $T_G$ means the time interval during which the MOS transistor 36 is made conductive. Numerals 7-4 and 7-5 show pulses for discharging a capacitor and pulses for transferring a signal, respectively, just like 4—4 and 4-5 in FIG. 4. The discharge pulses 7-4 and the transfer pulses 7-5 are applied to the terminal 34 and the terminal 35, respectively. Numeral 7-6 shows a signal at the output terminal 39, whose shaded region means a video signal component.

Next, the operation of the circuit shown in FIG. 6 will be described with reference to FIG. 7. First of all, a television video signal which has been detected is applied to the terminal 31 and is then sampled by sampling pulses applied to the terminals 32 and 33 so as to be successively stored in the first stage capacitors. The signal stored in the first stage capacitors are then transferred during the horizontal fly-back period $T_{HB}$ to next stage capacitors and at the same time fed to the terminal 39 as an output signal. After the transfer, the following signal corresponding to the next scanning line is sampled. The signal at the terminal 39 is written in the panel to be stored in the memory capacitor connected in parallel with the liquid crystal. The time required for writing in the panel can be several microseconds when the memory capacitor of the panel has a capacity of about 10 pF. Thus, the time interval $T_t$ is satisfactory for writing when it is taken to be about 1/5 $T_H$. On the other hand, the output signal shown in 7-6 can be obtained by making the transistor 36 conductive and sampling the signal shown in 7-2 within the time interval $T_G$.

The frequency of the erasing signal may be, as described hereinbefore, 15.75/2 KHz according to this process. However, when the signal shown in FIG. 7, 7—7 instead of that shown in FIG. 7, 7-2 is applied to the terminal 38 in FIG. 6, the frequency of the erasing signal applied to the panel is increased. In such a case, even a DSM liquid crystal having a higher critical frequency over which the crystal does not operate can be used. On the contrary, when the signal shown in 7-2 is further frequency-divided by ½ to be applied to the terminal 38, the frequency of the erasing signal applied to the panel can be decreased. Further, the existence of zero levels within the time interval $T_G$ in the signals shown in 7-2 and 7—7 is based on the consideration that any DC voltage should not be applied to the liquid crystal when the final pulse of the erasing signal is applied, and the signal shown in 7-2 can be provided by using, for example, a clamp circuit.

Next, the process of applying the signal to a display panel will be described. When the output signal shown in 7-6 is applied to the X electrodes of the panel, the time intervals $T_t$ and $T_G$ can be used for writing and erasing, respectively. Thus, it is sufficient that the writing signal which has a pulse of the interval $T_t$ is applied to the $Y_1$ electrode in the case of odd number field thereby to be shifted successively to the $Y_3$, $Y_5$, ___ electrodes, while a signal which has the same waveform as that of FIG. 7, 7-3, that is, has the pulse widths of $T_t$ and $T_G$ is applied to the Y electrodes, and accordingly the Y electrode selecting pulse generating circuit can be easily constituted by using conventional digital techniques taking the vertical synchronizing signal and the horizontal synchronizing signal as standards. For example, a serial-in and parallel-out shift register may be provided, and one pulse having a width of $T_H/2$ corresponding to the interval $T_t$ and a successive pulse wave having, similarly to 7-3, a pulse width of $T_H/2$ corresponding to the interval $T_G$ may be switched every field through AND circuits thereby to provide the datum input. Then, the standard clock signal may be a signal having a frequency of twice the horizontal frequency and the output signal may be provided by picking up the every second outputs of the shift register.

Figure 8:
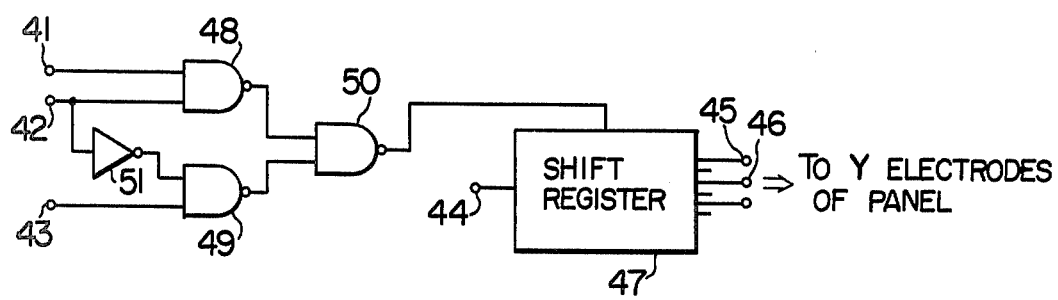
FIG. 8 shows an embodiment of a circuit for generating a Y electrode selecting pulse according to the present invention.
Figure 9:
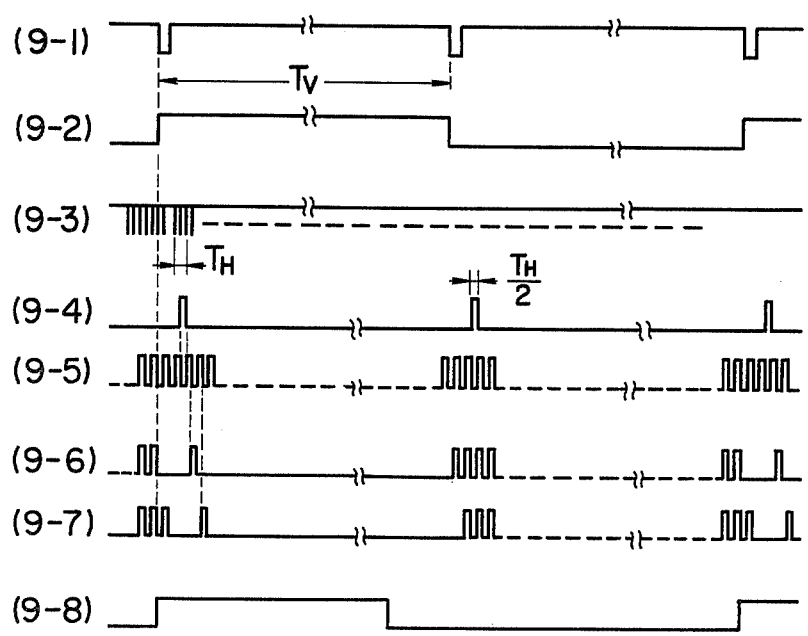
FIG. 9 shows waveforms illustrating the operation of FIG. 8.

FIG. 8 and FIG. 9 show an example of the Y electrode selecting pulse generating circuit and its operating waveforms, respectively. In FIG. 8, numeral 41 is an input terminal for writing the video signal, numeral 42 is a switching signal input terminal, numeral 43 is an input for the erasing signal, numeral 44 is a clock signal input terminal, and numerals 45 and 46 are the outputs of the shift register 47, which outputs 46 and 47 are connected with the Y electrodes of the panel. Numerals 48, 49 and 50 are AND circuits and numeral 51 is an inverter. In FIG. 9, numeral 9-1 shows the vertical synchronizing signal, and numeral 9-3 shows a clock signal having a frequency of twice the horizontal frequency applied to the terminal 44. Next, the operation of the circuit shown in FIG. 8 will be described with reference to FIG. 9. The terminals 41 and 43 are supplied with waveforms shown in 9-4 and 9-5, respectively, and both the signals are AND-gated by a switching signal shown in 9-2, passed through the AND gate and finally supplied to the shift register as a datum input. Thus, the terminals 45 and 46 can provide signals shown in 9-6 and 9-7, respectively. That is, the signals shown in FIG. 5, 5-3 and 5-3 can be provided. Similarly, the signals shown in 5-4 and 5-6 can be provided.

The above-described example has the writing and erasing repeated every field. However, since the total time is required only to be less than one frame (1/30 seconds) in consideration of the rising time and erasing time of the liquid crystal; in view of the fact that the signal in one horizontal scanning period is comprised of the video signal and the erasing signal, it is evident that, when, for example, the time interval during which the erasing signal is applied is desired to be more than one field, the datum input to the serial-in and parallel-out shift register in the Y electrode driving circuit is required only to be switched within one frame. That is, a signal shown in 9-8 which is obtained by operating a monostable multivibrator by means of the waveform 9-2 in FIG. 9 can be obtained. Further, the waveforms 7-2 and 7-3 in FIG. 7 show signals which have a standard of zero and values of $\pm V_o$. This AC driving is based on the consideration of the zero standard level of the liquid crystal and its service life.

According to the above-described driving method, it is possible to display all the scanning lines of the television signals (about 480 lines except the vertical fly-back periods in the standard television signal system). Next, consider the case that the number of the scanning lines on the panel is reduced. When the interlace scanning is not performed, that is, the number of the Y electrodes is 240, the above-described driving method is satisfactory. In this case, just as in the case of interlace scanning, for example, the video signal is applied on the panel in the case of odd number field or the erasing signal is applied on the panel in the case of even number field, thus causing flickering to occur. However, since this is sufficiently compensated by the memory action of the liquid crystal and the capacitor, the displayed video signals are satisfactory. Further, when not only the interlace scanning is not performed but also the scanning lines are eliminated for every second horizontal scanning line in each field, that is, the number of the Y electrodes is 120, the signals for driving the Y electrode (FIG. 5, 5-3 and 5—5) are required only to be so modified that the pulse width is unchanged but the delay time between the respective signals corresponding to two adjacent Y electrodes is doubled. When the scanning lines are further eliminated, a similar process is possible.

As described above, according to the present invention, it is possible to display television signals on a panel using DSM liquid crystals, and, in particular, it is possible to provide a circuit which can display television signals when liquid crystals of long erasing time are used and thus to use a very wide variety of liquid crystals. Therefore, the present invention is of very high industrial value.

We claim:

1. A method for driving by means of the line at a time process an X-Y matrix type liquid crystal panel having both switching elements and memory elements for respective picture elements comprising the steps of: dividing each horizontal scanning period into two periods, a video signal period and an erasing signal period; forming a composite signal having a video signal as one portion thereof and an erasing signal as another portion thereof; writing said video signal on said panel by means of a first pulse corresponding to said video signal period; and applying said erasing signal to said panel by means of a plurality of second pulses corresponding to said erasing signal period thereby to erase said panel.

2. A method for driving an X-Y matrix type liquid crystal panel as defined in claim 1, wherein said composite signal is applied to an X electrode group of said X-Y matrix type liquid crystal panel, said first pulse corresponding to said video signal period is applied successively to the Y electrode group of said X-Y matrix type liquid crystal panel, and said plurality of second pulses corresponding to said erasing signal period are applied successively to said Y electrode group.

3. A method for driving an X-Y matrix type liquid crystal panel as defined in claim 2, wherein said first pulse and said plurality of second pulses are switched by means of gate signals synchronized with a vertical synchronizing signal.

4. A method for driving an X-Y matrix type liquid crystal panel as defined in claim 1, wherein an erasing signal which is inverted every horizontal scanning line is inserted within said erasing signal period of said composite signal.

5. A method for driving an X-Y matrix type liquid crystal panel as defined in claim 1, wherein said composite signal is formed by converting a series video signal into parallel video signals to which are respectively added parallel erasing signals.

6. An apparatus for driving the electrodes of an X-Y matrix type liquid crystal display panel including paired switching elements and memory elements for respective picture elements, comprising a Y electrode pulse generator for sequentially scanning the Y electrodes of said panel, said Y electrode pulse generator including means for applying to each electrode a video signal write pulse during a first portion of a horizontal scanning period for said each electrode, and means for applying a first pulse stream erase signal to said each electrode during a second portion of said horizontal scanning period; and, a X electrode video signal processing circuit for sampling a video signal and sequentially supplying said samples to the X electrodes of said panel, said X electrode video signal processing circuit including means for supplying said video signal samples to said X electrodes during periods of time corresponding to said first portion of said horizontal scanning period, and means for supplying a second erase signal to said X electrodes during said second portion of said horizontal scanning period.

* * * * *